United States Patent [19]

Okumura

[11] Patent Number: 4,837,805
[45] Date of Patent: Jun. 6, 1989

[54] OPENING COMMAND TRANSMISSION SYSTEM AND METHOD CAPABLE OF REDUCING OVERHEAD IN AN INFORMATION PROCESSING UNIT

[75] Inventor: Teiji Okumura, Tokyo, Japan

[73] Assignee: NEC Corporation, Tokyo, Japan

[21] Appl. No.: 64,616

[22] Filed: Jun. 22, 1987

[30] Foreign Application Priority Data

Jun. 24, 1986 [JP] Japan .................................. 61-147498

[51] Int. Cl.⁴ ........................................... H04M 11/00
[52] U.S. Cl. ....................................... 379/90; 379/94; 379/95
[58] Field of Search ........................ 379/90, 92, 93, 94, 379/95, 96, 97, 98, 106, 107

[56] References Cited

U.S. PATENT DOCUMENTS

| | | | |
|---|---|---|---|
| 4,521,644 | 6/1985 | Bernard, Jr. | 379/98 |
| 4,640,989 | 2/1987 | River et al. | 379/94 |
| 4,713,837 | 12/1987 | Gordon | 379/93 |

*Primary Examiner*—Jin F. Ng
*Assistant Examiner*—David H. Kim

*Attorney, Agent, or Firm*—Foley & Lardner, Schwartz, Jeffery, Schwaab, Mack, Blumenthal & Evans

[57] ABSTRACT

In a system for use in opening a destination terminal from an information processing unit through a communication control unit and a public telephone network, a primary opening command is delivered only once in response to an opening request from the information processing unit to the communication control unit, with the primary opening command accompanied by a dial number and a terminal identifier assigned to the destination terminal. The communication control unit at first forms a communication path by the use of the dial number included in the primary opening command and thereafter transmits to the destination terminal, as a secondary opening command, a part of the primary opening command from which the dial number has been removed. The destination terminal is opened in response to the secondary opening command under the control of the communication control unit. The information processing unit carries out operations other than the opening of the destination terminal operation during transmission of the secondary opening command from the communication control unit.

4 Claims, 5 Drawing Sheets

OPENING COMMAND TRANSMISSION SYSTEM AND METHOD CAPABLE OF REDUCING OVERHEAD IN AN INFORMATION PROCESSING UNIT

BACKGROUND OF THE INVENTION

This invention relates to a transmission system and method both of which are for use in a data comunication network comprising an information processing unit, a communication control unit, a public telephone network, and a plurality of terminals, such as work stations or the like, connected through switched lines of the public telephone network.

In such a data communication network, the information processing unit is operable in accordance with a plurality of application programs. In this event, a session or communication is often carried out between hardware containing an application program and a selected terminal that may be called a destination terminal. In order to start or establish such communication between the application program and the destination terminal, the destination terminal is opened or initialized to be put into a communicable state prior to the communication. To this end, the information processing unit must transmit an opening command to the destination terminal when an opening request is issued from the application program.

More particularly, the information processing unit delivers a calling out or originating command to a communication control unit in response to the opening request. The calling out command accompanies a dial number or a calling data terminal equipment (DTE) address assigned to the destination terminal. Supplied with the calling out command, the communication control unit connects the destination terminal by the use of an automatic dialer, included therein, through the public telephone network and a network controller. After completion of such a connection, the communication control unit notifies the information processing unit of completion of the connection. As a result, a communication path is formed between the information processing unit and the destination terminal. Thus, the information processing unit first carried out the calling out operation of forming the communication path. After formation of the communication path, the information processing unit transmits the opening command through the communication control unit and the communication path to the destination terminal. Such an opening command is accompanied by a program address signal assigned to the application program in question and a terminal identifier assigned to the destination terminal. The destination terminal is put into a communicable state in response to the opening command. Thus, the information processing unit must carry out delivery of the opening command after the calling out operation.

As mentioned above, the information processing unit individually carries out the calling out operation and the delivering operation in a time division fashion on opening the destination terminal. Consequently, extra overhead inevitably exists in the information processing unit in the course of opening the destination terminal.

Such a transmission system is disclosed in Advanced Communications Function for VTAM issued by International Business Machines Corporation in 1980. In this prior art transmission system, the opening request is produced from an application program in the form of a macroinstruction specified by OPNDST (open destination) and is given to a program group which is called a VTAM (Virtual Telecommunications Access Method) program of the information processing unit. Responsive to the OPNDST, the information processing unit supplies the communication control unit with the calling out command which is named CONNOUT and which is accompanied by the dial number assigned to the destination terminal. The calling out command is processed by a network control program which runs in the communication control unit. After connection of the destination terminal, the information processing unit delivers the opening command referred to as BIND to the destination terminal through the communication control unit.

SUMMARY OF THE INVENTION

It is an object of this invention to provide a transmission system and method which are capable of reducing overhead of in an information processing unit in the course of opening a destination terminal.

It is another object of this invention to provide a transmission system and a transmission method of the type described, wherein operation of the information processing unit is simplified.

A method to which this invention is applicable involves opening a destination terminal from an information processing unit through a communication control unit and a public telephone network, before communication is carried out between a preselected of application program kept in the information processing unit and a destination terminal. The destination terminal is connected to a switched line of the public telephone network and is identified by a dial number and a terminal identifier which are assigned to the destination terminal. According to an aspect of this invention, there is provided the method comprising the steps of receiving in the information processing unit an opening request, for opening the destination terminal, from the preselected application program; of producing in the information processing unit, in response to reception of said opening request, a primary opening command carrying the dial number in addition to the terminal identifier; of transmitting the primary opening command from the information processing unit to the communication control unit; of storing the primary opening command in the communication control unit; of connecting the destination terminal to the communication control unit through the public telephone network by use of the dial number carried by the primary opening command stored in the communication control unit; of removing the dial number from the primary opening command to form the retaining part of the primary opening command, after completion of connection between the destination terminal and the communication control unit, to produce the remaining part as a secondary opening command; and of delivering the secondary opening command from the communication control unit to the destination terminal.

According to another aspect of this invention, there is provided a system for use in opening a destination terminal from an information processing unit, through a communication control unit and a public telephone network, before communication is carried out between a preselected application program kept in the information processing unit and a destination terminal. The destination terminal is connected to a switched line of the public telephone network and is identified, by a dial number and a terminal identifier which are assigned to the destination terminal. The information processing unit comprises receiving means, operable in cooperation with the preselected application program, for receiving an opening request for opening the destination terminal; producing means, responsive to the opening request, for producing a primary opening command carrying the dial number in addition to the terminal identifier; and transmitting means, coupled to the producing means, for transmitting the primary opening command from the information processing unit to the communication control unit. The communication control unit comprises storing means, for storing the primary opening command; connecting means, coupled to the storing means, for connecting the destination terminal through the public telephone network to the communication control unit by the use of the dial number kept in the storing means; removing means, coupled to the connecting means, for removing the dial number from the primary opening command to form the remaining part of the primary opening command, after completion of the connection between the destination terminal and the communication control unit, and to produce the remaining part as a secondary opening command, from which the dial number has been removed; and delivering means, coupled to the removing means, for delivering the secondary opening command to the destination terminal.

DESCRIPTION OF THE PREFERRED EMBODIMENT

Figure 1:
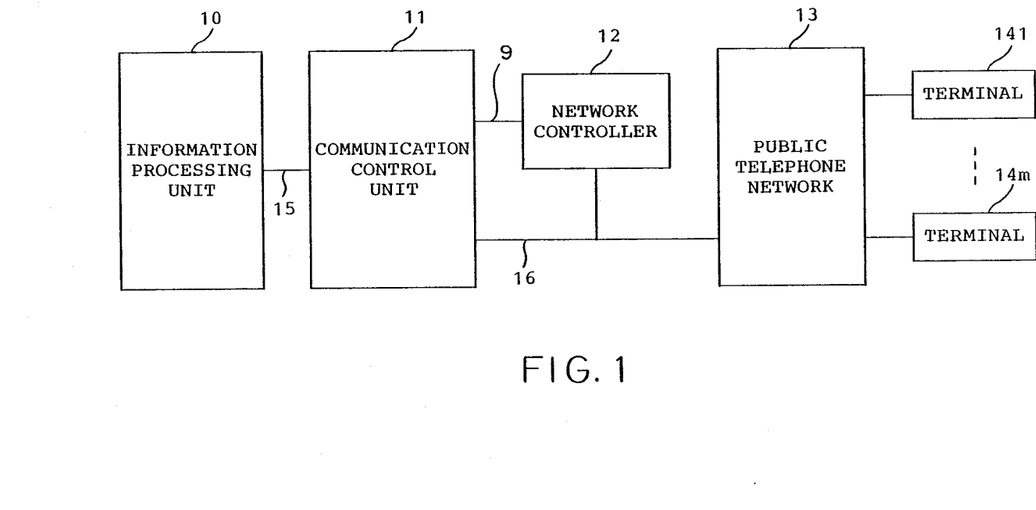
FIG. 1 is a block diagram of the transmission system according to a preferred embodiment of this invention.
Figure 2:
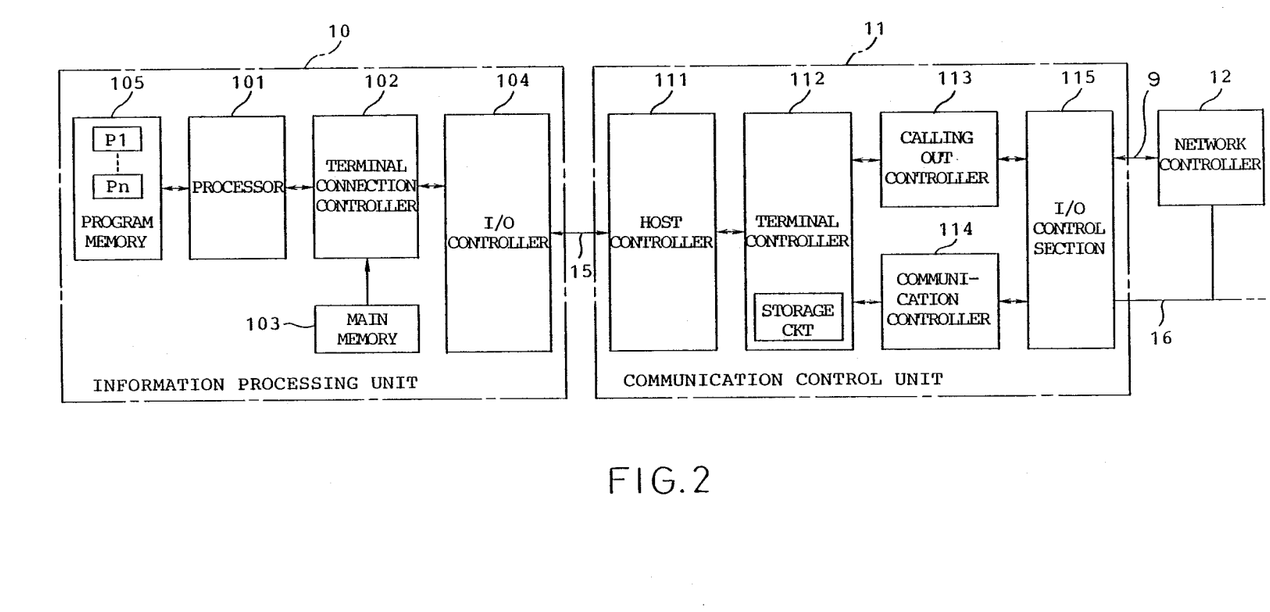
FIG. 2 is a block diagram for use in describing a part of the transmission system illustrated in FIG. 1 in detail.

Referring to FIGS. 1 and 2, description will at first be directed to a data communication network including a transmission system according to a preferred embodiment of this invention. As shown in FIG. 1, the data communication network comprises an information processing unit 10, a communication control unit 11, a network controller or network control unit 12, a public telephone network 13, and a plurality of terminals 141 through 14m. The information processing unit 10 may be a central processor implemented by a host computer and the information processing unit 10 forms a primary or central end. The information processing unit 10 is connected through a channel 15 to the communication control unit 11 which is operated in a manner to be described later. The channel 15 comprises a plurality of subchannels. The communication control unit 11 is connected to the public telephone network 13 through a communication line 16 which is divisible into a plurality of lines, even though the communication line 16 is represented in FIG. 1 by a single line. The network controller 12 is connected to the communication control unit 11 through a control line 9 and controls the public telephone network 13 under the control of the communication control unit 11. The network controller 12 comprises an automatic dialer (not shown) for calling a selected terminal or a plurality of selected terminals 141 to 14m.

Each of the terminals 141 to 14m is connected to the public telephone network 13 through a switched line (unnumbered) and may be connected to a plurality of input/output devices. From this fact, it is readily understood that each input/output device is specified or selected by a combination of a dial number assigned to each terminal, namely, each switched line, and a terminal identified assigned to each input/output device.

In FIG. 2, the information processing unit 10 comprises a processor 101, a terminal connection controller 102, a main memory 103, an input/output controller 104, and a program memory 105. The program memory 105 stores a plurality of application programs depicted as P1 to Pn. Each of the application programs P1 to Pn is executed in the processor 101 in accordance with an operating system communication control program located in the processor 101.

Figure 3:
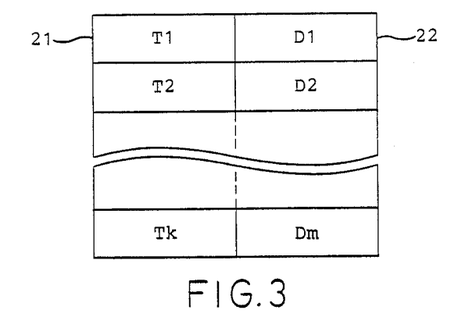
FIG. 3 is a memory map for use in describing a relationship between terminal identifiers and dial numbers of in the transmission system illustrated in FIGS. 1 and 2.

Referring to FIG. 3 together with FIG. 2, the main memory 103 is loaded with a table as shown in FIG. 3. The table is divided into a first field 21 and a second field 22. The first field 21 stores terminal identification values, namely, terminal identifiers T1 to Tk for uniquely identifying the terminals. Such terminal identifiers serve to identify the terminals or input/output devices after connection of the switched lines. On the other hand, the second field 22 stores the dial numbers D1 to Dm corresponding to the terminal identifiers T1 to Tk. As mentioned before, the number of the terminal identifiers T1 to Tk is not always equal to that of the dial numbers D1 to Dm. The table is accessed by the terminal connection controller 102 which is operated in a manner to be described in conjunction with FIGS. 4 and 5.

Figure 6A:
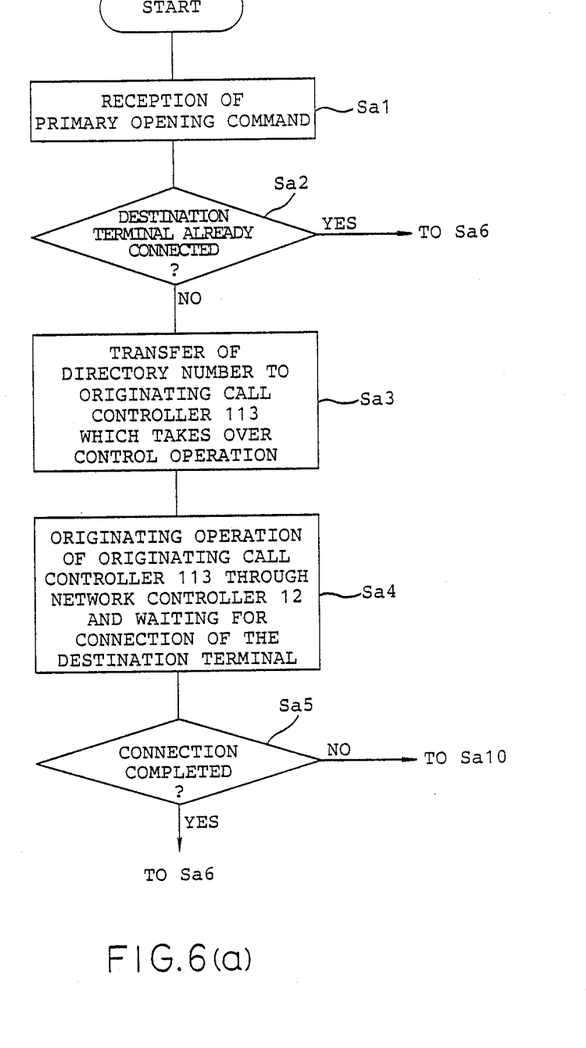
FIGS. 6(a) and 6(b) are flow charts for use in describing operation of another portion of the transmission system illustrated in FIGS. 1 and 2.
Figure 6B:
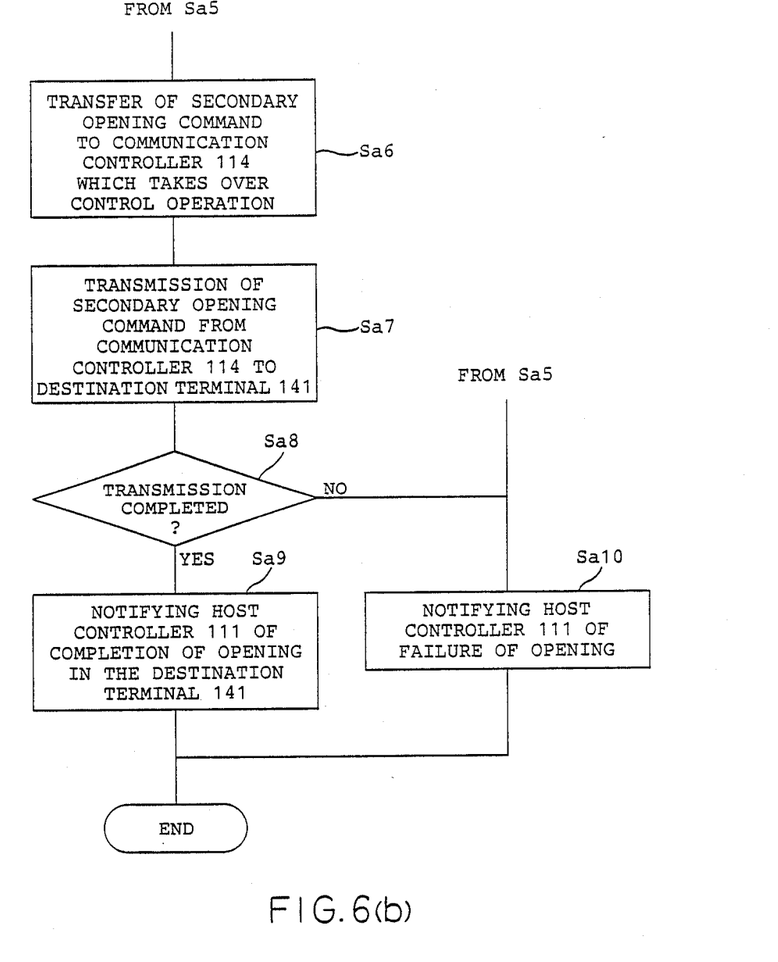

As shown in FIG. 2, the communication control unit 11 is coupled through the channel 15 to the input/output controller 104 and comprises a host controller 111 coupled to the channel 15, a terminal controller 112 coupled to the host controller 111, a calling out controller 113, a communication controller 114, and an input/output control section 115. The calling out controller 113 and the communication controller 114 are operated under the control of the terminal controller 112 in a manner to be described with reference to FIG. 6.

Now, the transmission system according to this invention is used in initializing or opening a destination terminal 141 to 14m in a manner to be described hereinunder prior to starting or establishing a session between the hardware associated with a preselected application program P1 to Pn and a destination terminal. Without loss of generality, it may be assumed, as an illustrative example, that the terminal 141 is to be opened as the destination terminal by the application program P1. In this event, an opening request for opening the destination terminal 141 is issued by the application program P1 and is sent from the processor 101 to the terminal connection controller 102.

Figure 4:
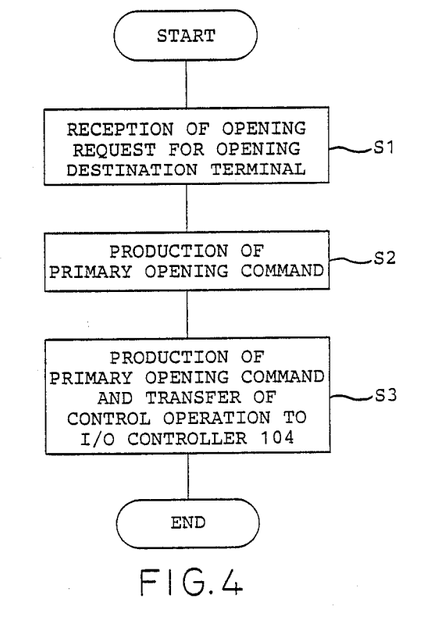
FIG. 4 is a flow chart for use in describing operation of a portion of the transmission system illustrated in FIGS. 1 and 2.

Referring to FIG. 4 and FIG. 2, operation of the terminal connection controller 102 is started and proceeds to a first step Sl in which the opening request is received by the terminal connection controller 102. Thus, the first step Sl may be called a receiving step for receiving the opening request. The opening request includes the terminal identifier Tl related to destination terminal 141 and the information necessary for connection of the destination terminal. Such information specifies the destination terminal in the form of a symbolic name. After reception of the opening request, a second step S2 follows the first step Sl so as to produce an opening command indicative of opening the destination terminal 141. For convenience of description, this opening command may often be called a primary opening command.

Figure 5:
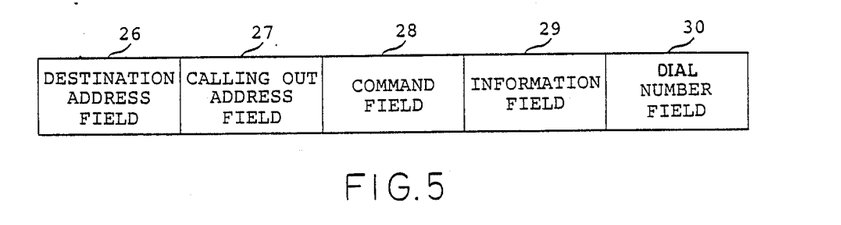
FIG. 5 is an information format for use in describing operation of the transmission system illustrated in FIGS. 1 and 2.

Referring to FIG. 5, the primary opening command has a destination address field 26 for a terminal identifier, a calling out address field 27 for a program address assigned to the application program Pl, a command field 28 for arranging an operation code representative of a species of the command, an information field 29 for arranging information indicative of the content of the command, and a dial number field 30 for a dial number assigned to the destination terminal.

The primary opening command carries the dial number and the terminal identifier related to the destination terminal 141 in addition to the program address and the information field. As will become clear, such a primary opening command effectively operates the communication control unit 11 and results in the reduction of the overhead associated with the information processing unit 10.

Referring back to FIG. 4, the illustrated primary opening command is formed by the terminal connection controller 102, as shown in third step S3. More specifically, the terminal connection controller 102 accesses the main memory 103 by the use of the terminal identifier Tl included in the opening request given from the application program Pl. As a result, the dial number Dl is read out of the second field 22 of the table illustrated in FIG. 3. The terminal identifier Tl and the dial number Dl for the destination terminal 141 are arranged in the destination address field 26 and the dial number field 30 illustrated in FIG. 5, respectively. In addition, the program address of the application program Pl is placed in the calling out address field 27 by the terminal connection controller 102. The terminal connection controller 102 also places an operation code and arranging information in the common field 28 and the information field 29, respectively. In this case, the operation code is representative of an opening command. The arranging information is given by the application program Pl. Thus, the second step S2 may be referred to as a producing step for producing the primary opening command.

Subsequently, the primary opening command is sent from the terminal connection controller 102 to the input/output controller 104, as shown in the third step S3. Thereafter, control operation is transferred to the input/output controller 104. The input/output controller 104 transmits the primary opening command to the communication control unit 11 and, for this reason, may be called a transmission circuit for transmitting the primary opening command to the communication control unit 11.

It is to be noted here that the primary opening command may be sent from the information processing unit 10 through the channel 15 to the communication control unit 11 only once. The significance of this will be described later.

The primary opening command is received by the host controller 11 and is sent from the host controller 111 to the terminal controller 112. As a result, the terminal controller 112 takes over control operation together with the primary opening command. The primary opening command is stored in a storage circuit (unnumbered) in the terminal controller 112.

Referring to FIGS. 6(a) and 6(b) in addition to FIG. 2, description will be made concerning operation of the communication control unit 11 carried out after reception and storage of the primary opening command. The terminal controller 112 starts operation and receives the primary opening command at a first stage Sal from the host controller 111. The first stage Sal is followed by a second stage Sa2 which detects whether the destination terminal is already connected, based on information from the destination address field 26 (FIG. 5). The terminal controller 112 can monitor each of the terminals 141 to 14m through the communication line 16 and the public telephone network 13 in a known manner. Specifically, the terminal controller 112 can monitor a connection state indicative of whether or not each terminal is already connected to the terminal controller 112. In the illustrated example, the terminal controller 112 monitors the connection state of the destination terminal 141 indicated by the terminal identifier Tl of the destination address field 26.

If the destination terminal 141 is not connected to the terminal controller 112, the second stage Sa2 proceeds to a third stage Sa3 for connecting the destination terminal 141 by the use of the dial number Dl placed in the dial number field 30 (FIG. 5). To this end, the dial number Dl is transferred as a parameter for connection from the terminal controller 112 to the calling out controller 113 at the third stage Sa3. Consequently, the calling out controller 113 undertakes control operation.

Subsequently, the third stage Sa3 is followed by a fourth stage Sa4 which concerns controlling the network controller 12. Inasmuch as the network controller 12 comprises an automatic dialer as known in the art, the dial number Dl is automatically dialed by the automatic dialer in response to an indication from the calling out controller 113 and is sent to the public telephone network 13 at the fourth stage Sa4. Thereafter, the calling out controller 113 waits for the connection of the destination terminal 141. Such operation may be called the calling out operation of connecting the destination terminal 141 to the communication control unit 11. In this case, the calling out controller 113 may be called a connection circuit for connecting the destination terminal 141 through the public telephone network 13.

After the calling out operation, the calling out controller 113 judges at a fifth stage Sa5 whether or not the connection of the destination terminal 141 is completed through the public telephone network 13 and the communication line 16. If the connection is completed between the destination terminal 141 and the communication control unit 11, the fifth stage Sa5 is followed by a sixth stage Sa6 (FIG. 6(b)) carried out in the terminal controller 112.

The sixth stage Sa6 also follows the second stage Sa2 when the destination terminal 141 is already connected to the communication control unit 11 at the second stage Sa2. A communication path is formed between the terminal controller 112 and the destination terminal 141 through the communication line 16, the input/output control section 115, and the calling out controller 113 after completion of the connection, as well known in the art. Thus, the communication path is monitored by the terminal controller 112.

Under these circumstances, the terminal controller 112 removes the dial number D1 from the primary opening command kept therein to form the remaining part of the primary opening command at the sixth stage Sa6. The remaining part of the primary opening command is sent from the terminal controller 112 to the communication controller 114 as a secondary opening command. As a result, control operation is taken over by the communication controller 114.

At a seventh stage Sa7, the communication controller 114 sends the secondary opening command as a control parameter to the destination terminal 141 and waits for completion of the transmission of the secondary opening command.

The destination terminal 141 interprets and executes the secondary opening command to be put into a communicable state. Such a communicable state of the destination terminal 141 is detected by the communication controller 114 on completion of the transmission of the secondary opening command.

When the communication controller 114 detects completion of the transmission of the secondary opening command at an eighth stage Sa8, a ninth stage Sa9 succeeds the eight stage Sa8 so as to notify the host controller 111 of the completion of the opening to the destination terminal 141.

Otherwise, the eighth stage Sa8 is followed by a tenth stage Sa10 which is also carried out when the connection is not completed at the fifth stage Sa5 (FIG. 6(a)). In this situation, at the tenth stage Sa10, the communication controller 114 notifies the host controller 111 of the failure of opening to the destination terminal 141. Thus, opening operation comes to an end in the communication control unit 11.

After the host controller 111 is notified of the opening of the destination terminal 141 is at the ninth stage Sa9, the information processing unit 10 is accessed by the host controller 111 to start communication or a session between the handware associated with application program P1 and the destination terminal 141. Accordingly, the information processing unit 11 is accessed only once after production of the primary opening command. This shows that overhead associated with information processing unit 10 is reduced when opening the destination terminal, such as 141, because the information processing unit 10 can carry out other operations while the communication control unit 11 processes the primary opening command.

While this invention has thus far been described in conjunction with a preferred embodiment thereof, it will readily be possible for those skilled in the art to put this invention into practice in various other manners. For example, a plurality of input/output devices may be connected to each terminal. In addition, a plurality of communication control units 11 may be connected to the information processing unit 10. Moreover, this invention is also applicable to a system comprising a plurality of information processing units.

What is claimed is:

1. A method of opening a destination terminal from an information processing unit through a communication control unit and a public telephone network, connected to said communication control unit, before communication is carried out between hardware associated with a preselected application program kept in said information processing unit and said destination terminal, said destination terminal being connected to a switched line of said public telephone network and being identified by a dial number and a terminal identifier which are assigned to said switched line and said destination terminal, respectively, said method comprising the steps of:

receiving in said information processing unit an opening request, for opening said destination terminal, from said preselected application program;

producing in said information processing unit, in response to reception of said opening request, a primary opening command carrying said dial number in addition to said terminal identifier;

transmitting said primary opening command from said information processing unit to said communication control unit;

storing said primary opening command in said communication control unit;

connecting said destination terminal to said communication control unit through said public telephone network by the use of said dial number, carried by said primary opening command stored in said communication control unit;

removing said dial number from said primary opening command to form a remaining part of said primary opening command, after completion of the connection between said destination terminal and said communication control unit, to produce the remaining part as a secondary opening command;

delivering said secondary opening command from said communication control unit to said destination terminal; and connecting said communication control unit to said information processing unit so as to enable communication between hardware associated with said preselected application program and said destination terminal through said communication control unit and said public telephone network.

2. A method as claimed in claim 1, further comprising, after said delivering step and before said connecting step of said communication control unit to said information processing unit, the steps of:

monitoring completion of the delivery of said secondary opening command to said destination terminal in said communication control unit; and notifying said information processing unit of said completion of the delivery of the secondary opening command to said destination terminal.

3. A system for use in opening a destination terminal from an information processing unit through a communication control unit and a public telephone network, connected to said communication control unit, before communication is carried out between hardware associated with a preselected application program kept in said information processing unit and said destination terminal, said destination terminal being connected to a switched line of said public telephone network and identified by a dial number and a terminal identifier which are assigned to said switched line and said destination terminal, respectively;

said information processing unit comprising:

receiving means, operable in cooperation with said preselected application program, for receiving an opening request for opening said destination terminal specified by said dial number;

producing means, responsive to said opening request, for producing a primary opening command carrying said dial number in addition to said terminal identifier; and transmitting means, coupled to said producing means, for transmitting said primary opening command from said information processing unit to said communication control unit;

said communication control unit comprising:

storing means for storing said primary opening command;

connecting means, coupled to said storing means, for connecting said destination terminal through said public telephone network to said communication control unit by the use of said dial number kept in said storing means;

removing means, coupled to said connecting means, for removing said dial number from said primary opening command to form a remaining part of said primary opening command after the completion of the connection between said destination terminal and said communication control unit, and for producing said remaining part as a secondary opening command from which said dial number has been removed;

delivering means, coupled to said removing means, for delivering said secondary opening command to said destination terminal; and additional connecting means for connecting said communication control unit to said information processing unit so as to enable communication between the hardware associated with said preselected application program and said destination terminal through said communication control unit and said public telephone network.

4. A system as claimed in claim 3, wherein said communication control unit further comprises:

monitoring means, operated in cooperation with said delivery means, for monitoring the completion of the delivery of said secondary opening command to said destination terminal;

notifying means, coupled to said monitoring means, for notifying said information processing unit of said completion of the delivery of said secondary opening command to said destination terminal; and said additional connecting means being operated after said notifying means notifies said information processing unit of said completion.

* * * * *